US009900792B2

(12) United States Patent
Jablonski

(10) Patent No.: US 9,900,792 B2
(45) Date of Patent: Feb. 20, 2018

(54) AGGREGATE RADIO INTERFERENCE MODELING AND SIMULATION PLATFORM

(71) Applicant: The Johns Hopkins University, Baltimore, MD (US)

(72) Inventor: Daniel G. Jablonski, Bethesda, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/398,331

(22) Filed: Jan. 4, 2017

(65) Prior Publication Data

US 2017/0195904 A1 Jul. 6, 2017

Related U.S. Application Data

(60) Provisional application No. 62/274,865, filed on Jan. 5, 2016.

(51) Int. Cl.
H04B 17/00 (2015.01)
H04W 24/06 (2009.01)
H04W 52/24 (2009.01)
H04L 29/06 (2006.01)

(52) U.S. Cl.
CPC ......... H04W 24/06 (2013.01); H04W 52/242 (2013.01); H04L 65/80 (2013.01)

(58) Field of Classification Search
CPC ...... H04L 65/80; H04W 24/06; H04W 52/242
See application file for complete search history.

(56) References Cited

U.S. PATENT DOCUMENTS 4,500,883 A 2/1985 Gutleber
5,048,015 A 9/1991 Zilberfarb
5,179,722 A 1/1993 Gunmar et al.
6,137,991 A 10/2000 Isaksson
6,442,384 B1 8/2002 Shah et al.
(Continued)

FOREIGN PATENT DOCUMENTS

EP 0660633 12/1994

OTHER PUBLICATIONS

Joe P. Giangrosso et al., Commerce Spectrum Management Advisory Committee (CSMAC) Working Group 5 (WG5), "Aeronautical Mobile Telemetry", Jun. 2013, pp. 1-24.
Ken Keane et al., "Radio Communication Study Group Fact Sheet", Jul. 2006, pp. 1-37.
(Continued)

Primary Examiner — Xin Jia
(74) Attorney, Agent, or Firm — Todd R. Farnsworth

(57) ABSTRACT

An apparatus comprising processing circuitry may be configured to execute an interference simulation using a plurality of processing functions on interference data defined for each of a plurality of geographically diverse emitters interfering with one or more victim receivers via a data processing platform. The data processing platform may be defined via an interpretive language that does not use compiling. The processing functions may include determining aggregate interference data, based on the interference data, for at least a selected one of the receivers relative to corresponding ones of the emitters. The aggregate interference data may include directional information in both azimuth and elevation with respect to both the emitters and the receivers. The processing functions may further include displaying the aggregate interference data in a tabular format, and enabling a change to the interference data to be processed in real time to update the aggregate interference data.

20 Claims, 9 Drawing Sheets

(56) References Cited

U.S. PATENT DOCUMENTS

| | | |
|---|---|---|
| 6,950,665 B2 | 9/2005 | Swift et al. |
| 7,013,113 B2 | 3/2006 | Dickey |
| 7,151,761 B1 | 12/2006 | Palenius |
| 7,236,746 B2 | 6/2007 | Peric |
| 7,245,939 B2 | 7/2007 | Goldberg |
| 8,014,785 B2 | 9/2011 | Zhao et al. |
| 8,170,081 B2 | 5/2012 | Forenza et al. |
| 8,390,515 B2 | 3/2013 | Ketonen |
| 8,472,968 B1 | 6/2013 | Kim |
| 8,477,754 B2 | 7/2013 | Kakura |
| 8,542,638 B2 | 9/2013 | Moelker et al. |
| 9,008,680 B2 | 4/2015 | Abdelmonem et al. |
| 9,143,413 B1 | 9/2015 | Manku et al. |
| 9,143,968 B1 | 9/2015 | Manku et al. |
| 9,214,983 B2 | 12/2015 | Abdelmonem et al. |
| 9,264,261 B2 | 2/2016 | Korowajczuk |
| 9,270,425 B2 | 2/2016 | Xue et al. |
| 2005/0117676 A1 | 6/2005 | Liu |
| 2010/0087221 A1 | 4/2010 | Srinivasan et al. |

OTHER PUBLICATIONS

Robert Frazier et al., U.S. Department of Transportation Federal Aviation Administration, "Final Report: A Generalized Statistical Model for Aggregate Radio Frequency Interference to Airborne GPS Receivers from Ground Based Emitters", Sep. 30, 2014, pp. 1-25.

International Civil Aviation Organization, Regional Preparatory Group (RPG) Meeting for World Radiocommunication Conference 2007 (WRC—2007), ACP Working Group B and F and NSP SSG Meetings, "Aeronautical Services", Bangkok, Thailand, Feb. 2005, pp. 1-29.

AGGREGATE RADIO INTERFERENCE MODELING AND SIMULATION PLATFORM

CROSS-REFERENCE TO RELATED APPLICATIONS

This application claims the benefit of U.S. Provisional Application No. 62/274,865 filed on Jan. 5, 2016, the entire contents of which are hereby incorporated herein by reference.

TECHNICAL FIELD

Example embodiments generally relate to wireless signal transmission and reception and, more particularly, relate to providing an enhanced capability for management or sharing of electromagnetic spectrum.

BACKGROUND

Wireless communications networks and the devices that operate therein have become ubiquitous in modern society. These devices allow users to maintain a nearly continuous level of connectivity to the Internet and other devices/networks. Meanwhile, wireless signal transmissions for other uses are also transmitting in the same geographic locations. As such, the danger exists for various ones of the wireless signal emitters to interfere with each other.

Meanwhile, there are fairly limited frequency bands that are both suitable and available (for regulatory reasons) to be employed for the many uses that exist to take advantage of wireless signal transmission. Although the institution of wide bands of separation may be a relatively easy to employ technique for mitigating or reducing the likelihood of interference, this technique becomes less possible and less economically feasible to employ as the users of spectrum increase. Presently, spectrum is generally sold for astronomical amounts of money. With less available spectrum, and costs skyrocketing, the ability to efficiently use spectrum becomes ever more important.

BRIEF SUMMARY OF SOME EXAMPLES

In an example embodiment, an apparatus comprising processing circuitry is provided. The processing circuitry may be configured to execute an interference simulation using a plurality of processing functions on interference data defined for each of a plurality of geographically diverse emitters interfering with one or more victim receivers via a data processing platform. The data processing platform may be defined via an interpretive language that does not use compiling. The processing functions may include determining aggregate interference data, based on the interference data, for at least a selected one of the receivers relative to corresponding ones of the emitters. The aggregate interference data may include directional information in both azimuth and elevation with respect to both the emitters and the receivers. The processing functions may further include displaying the aggregate interference data in a tabular format, and enabling a change to the interference data to be processed in real time to update the aggregate interference data.

In one example embodiment, a method for simulating interference is provided. The method includes receiving interference data defined for each of a plurality of geographically diverse emitters interfering with one or more victim receivers. The interference data is received at a data processing platform defined via an interpretive language that does not use compiling. The method further includes determining, via the data processing platform, aggregate interference data based on the interference data for at least a selected one of the receivers relative to corresponding ones of the emitters. The aggregate interference data includes directional information in both azimuth and elevation with respect to both the emitters and the receivers. The method further includes displaying, via the data processing platform, the aggregate interference data in a tabular format, and enabling, via the data processing platform, a change to the interference data to be processed in real time to update the aggregate interference data.

In another example embodiment, a system for simulating interference is provided. The system may include a plurality of geographically diverse emitters, one or more victim receivers with which the emitters interfere, and a data processing platform defined via an interpretive language that does not use compiling, where the data processing platform is configured to receive interference data associated with the receivers and emitters. The data processing platform may be configured to determine aggregate interference data based on the interference data for at least a selected one of the receivers relative to corresponding ones of the emitters. The aggregate interference data may include directional information in both azimuth and elevation with respect to both the emitters and the receivers. The data processing platform may further be configured to display the aggregate interference data in a tabular format, and enable a change to the interference data to be processed in real time to update the aggregate interference data.

BRIEF DESCRIPTION OF THE SEVERAL VIEWS OF THE DRAWING(S)

Having thus described the invention in general terms, reference will now be made to the accompanying drawings, which are not necessarily drawn to scale.

FIG. 4 illustrates an example of table look-up by indirect addressing in accordance with an example embodiment;

FIG. 5 illustrates an example output that may be generated in accordance with an example embodiment to show an aggregate of data received by bearing bin;

FIG. 6 illustrates results of a convolution operation performed in accordance with an example embodiment;

FIG. 7 illustrates a result of convolution for a different site prior to modification of the data in accordance with an example embodiment;

FIG. 8 illustrates a result of convolution for the different site of FIG. 7 after modification of the data in accordance with an example embodiment.

DETAILED DESCRIPTION

Figure 1:
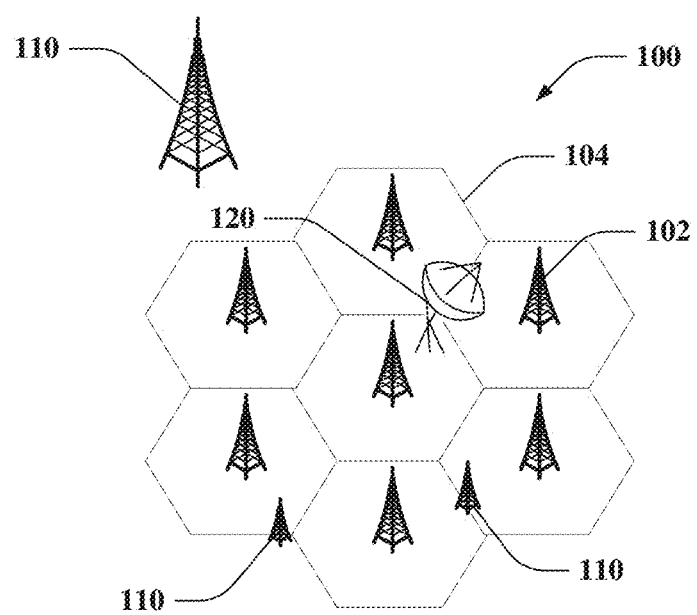
FIG. 1 illustrates an example layout of emitters in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As used in herein, the terms "component," "module," and the like are intended to include a computer-related entity, such as but not limited to hardware, firmware, or a combination of hardware and software (i.e., hardware being configured in a particular way by software being executed thereon). For example, a component or module may be, but is not limited to being, a process running on a processor, a processor (or processors), an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Software programs have been developed to try to help network planners make efficient designs in consideration of the factors that impact any particular geographic area. However, these programs tend to employ complicated computer programming techniques and large commercial packages that are both time consuming and expensive to operate. Accordingly, a need may exist to develop less expensive solutions for assisting network planners. Moreover, to the extent that a solution could be found that is both more affordable and faster, significant value could be achieved.

Some example embodiments described herein provide for a data processing platform that can be instantiated at an apparatus comprising configurable processing circuitry. The processing circuitry may be configured to execute various processing functions on interference data defined for a plurality of geographically diverse emitters that interfere with one or more victim receivers. The data processing platform may, for example, be defined via an interpretive language that does not use compiling. In an embodiment, a series of database tables or spreadsheets can be used to store the interference data and the data processing platform may be rapidly updateable to account for changes made thereto in real time. The database tables or spreadsheets may include tables defined for individual receivers or groups thereof, and may be cross linked internally to other databases or information sources. Interference data can be aggregated in any of a number of ways to generate aggregated interference data that can ultimately be useful for modeling potential changes or improvements to network design or configuration. Real time configuration changes can be tested and instituted to better and more efficiently utilize spectrum in a particular area, or across the entire geographic area covered by a particular network or group of networks. For example, network designers of broadband cellular systems typically have a deep understanding of the merits of one design tradeoff versus another. An example embodiment of the present invention may be configured to permit temporary changes and adjustments to individual cell entries with an immediate computation of the impact of the design change on the aggregate interference requirements that must be met before a cellular network can be deployed and brought into service. This may provide a fast, accurate, and cost-effective tool for bringing a network design into compliance with interference requirements while still maintaining and achieving quality of service goals.

Using existing commercially available software for a typical situation in which a robust application is desired for understanding interference within a geographic area, the software application is built using compiling. High level, compiled languages are typically used to execute complex functionalities, but often employ repeated use of corner turns and/or loops. Because compiled languages often execute faster than interpreted languages, the industry standard has been to build commercial products that utilize compiling for modeling interference data. However, in complex networks with large numbers of potential interferers, and particularly where rotating antennas or directionally steerable antennas are employed, the numbers of loops and corner turns can become quite large since the different steering angles and different emitters being modeled would be handled by simply repeating processes over and over. In such cases, the number of loops and corner turns can cause the computational load on the processing circuitry to become quite heavy. The time needed to execute calculations or updates can therefore become quite long, and the costs of such systems can also be quite high due to the levels of complexity involved.

By employing an interpretive language instead of a compiled language, computational speed can actually improve (contrary to the otherwise expected norm) since the loops may actually be unwound/unrolled, which results in a net savings of time and processing power requirements. Accordingly, the coding of spreadsheet-like features (e.g., the ability to view and modify individual cell entries quickly and reversibly) permits the user of an embodiment of the invention to analyze the impact of design changes on large quantities of data at one time. Also, by using a spreadsheet with its implicit features, loop unrolling and the ability to review large amounts of data may be simultaneously achieved. Loop unrolling may permit individual date elements and long lists of data to be viewed without using the labor-intensive "peek" and "poke" commands needed to access data stored in matrix form. Additionally, loop unrolling eliminates the "if" statement, which is computationally slow relative to other computing operations that must be executed for each and every iteration of a for/next loop, do-loop, or if/then loop. Meanwhile, if a compiled language were employed, loop unrolling and the ability to review large amounts of data would be independent features that each run separately with their own execution time deficiencies, thereby leading to a need for massive amounts of processing power and time to calculate the multipoint to multipoint computations necessary for modeling aggregated interference data. In particular, in a typical compiled language format, a print statement would be coded within each loop, so that computing and displaying a list of, for example, N data elements requires execution of the print statement coded within the loop N times, with execution of both the print statement and an if statement for each and every one of the N loop iterations. A traditional exception to this is the use of highly specialized compilers designed for and operating on what are referred to as "vector-pipeline" computer architectures. These are associated with large mainframe computers that are now regarded as being obsolete. The spreadsheet approach specific to an embodiment of the invention, achieves the benefits of the vector-pipeline architecture within the multi-processor-core architectures that exemplifies modern personal computers and "supported platforms" (e.g., tablets, smartphones, and other smart devices).

Before describing specific details regarding operation of an example embodiment, an example context in which an example embodiment may be practiced will be described in reference to FIG. 1. FIG. 1 illustrates an example layout of emitters in a particular geographic area in accordance with an example embodiment. As shown in FIG. 1, the geographical area may be associated with operation of a terrestrial wireless communication network 100 having a plurality of transmitter and/or transceiver stations 102 that each serve a respective area (or cell 104). The geographical area may also include one or more other wireless emitters 110 that may be associated with other networks or other services that employ wireless signal transmissions. Each of the other wireless emitters 110 may be associated with a different network than the terrestrial wireless communication network 100, or at least some of the other wireless emitters 110 may be associated with separate networks, or emission sources that are not part of a network at all.

The transmitter and/or transceiver stations 102 and the other wireless emitters 110 may be omnidirectional emitters, may emit in fixed pre-configured directions, may employ beam steering or beamforming techniques to cover large areas, may be rotating structures, or any other type of emitters capable of radiating radio frequency (RF) or other wireless signals. Thus, for example, the transmitter and/or transceiver stations 102 and the other wireless emitters 110 may be associated with, for example, broadband cellular communication devices, medical body area networks, wireless microphones, digital satellite radio, broadband telemetry systems (e.g., terrestrial and space-based systems), and/or the like, including signals generated at frequencies above and below the traditional limits of radio waves, such as light waves, and signals generated using non-electromagnetic techniques, such as acoustics and ultrasonics. Essentially, the transmitter and/or transceiver stations 102 and other wireless emitters 110 are intended to illustrate example emitters that may be causing potential interference to a victim receiver 120 that is located in the geographical area.

The victim receiver 120 may, for example, be one of the transmitter and/or transceiver stations 102 or one of the other wireless emitters 110 in some cases. However, the victim receiver 120 could also be part of a separate network entirely, or a stand-alone component that is not necessarily networked at all. In some cases, the victim receiver 120 may merely be a theoretical component that is intended to become part of a planned network or part of the terrestrial wireless communication network 100. The victim receiver 120 may be either a fixed or mobile receiver. In some examples, the victim receiver 120 may also be a receiver that has the capability of being steered or listening for wireless signaling from a number of different directions (e.g., including in three dimensions). Thus, for example, the victim receiver 120 may be capable of receiving interference from selected and/or multiple transmitter and/or transceiver stations 102 and from other wireless emitters 110 whose signals may be received through antenna side-lobes even when the victim receiver 120 is pointed at transceiver stations 102 while not being directly pointed at the interference transmitters 110.

As can be appreciated from the architecture described in reference to FIG. 1, the potential for interference at the victim receiver 120 may be large. Thus, in order to optimize management of spectrum, it may be desirable to be able to model the adjacent and co-channel interference that may be experienced by the victim receiver 120 from all possible sources (e.g., from the transmitter and/or transceiver stations 102 and the other wireless emitters 110). By effectively modeling the interference experienced by the victim receiver 120, it may be possible to make adjustments to specific devices (e.g., transmitter and/or transceiver stations 102, other wireless emitters 110, victim receiver 120, etc.) in order to reduce the potential for interference. Moreover, by modeling and simulating the interference experienced by multiple (or every) victim receiver in a particular network, the operation of the entire network may be optimized to reduce the potential for interference while still allowing maximum usage of the corresponding spectrum.

As mentioned above, current commercial packages for conducting such modeling are expensive and also operate relatively slowly due to the use of compiled language to generate such packages. The use of compiled language is entirely intuitive in light of the general feature of compiled languages to offer faster execution than interpretive languages. However, the number of loops and corner turns that can be generated in the context of computations involving large networks of potential interferers that may impact many possible victim receivers (i.e., in a multipoint to multipoint system) may end up making the packages operate very slowly and inefficiently. An example embodiment may therefore employ an interpretive language to define a data processing platform that is scalable to arbitrarily large amounts of data to avoid unnecessary repeated computation. Example embodiments may also provide a solution that results in an ability to separate individual parts of the solution so that the parts can be run independently on a plurality of processors that do not need to communicate with each other or be co-located. This provides unlimited parallelization and/or parallizability for the purpose of reducing processing time. Processing time may increase linearly with the amount of data, but not superlinearly or exponentially (which can happen when the numbers of loops and corner turns become large). The separability of parts for paralliz-ability may also avoid the need to increase licensing fees associated with copying or cloning the solution (or portions thereof) on other machines. Example embodiments may also be relatively simple and intuitive to employ so that unskilled persons can be trained on the solution with relative ease. As a result, example embodiments may provide a linearly scalable solution that is also compressible. A linearly scalable solution that is also compressible may be achieved because of the recursive and/or repetitive rules that relate the operations performed in a core of spreadsheet cells directly to the operations in the expanded cells. Put differently, by saving the rules for programming individual cells, rather than the programmed cells themselves, a spreadsheet can be reduced in size, as desired, without losing the ability to expand it, without error, to its original or even larger sizes. The size of the tables employed may be proportional to the number of rows times the number of columns. A reconfigurable, parallizable and separable solution therefore results, and provides significant advantage over existing systems. For example, a spreadsheet programmed for handling interference from one hundred sources into ten victim receivers can be, without error, expanded using simple "click and drag" operations via a pointing device (e.g., touch pad, touch screen, or mouse) into a spread sheet capable of computing aggregate interference from an arbitrarily large number of interferers into an arbitrarily large number of victim receivers, without the need to create or "write" or "insert" additional code into an embodiment of the invention.

Figure 2:
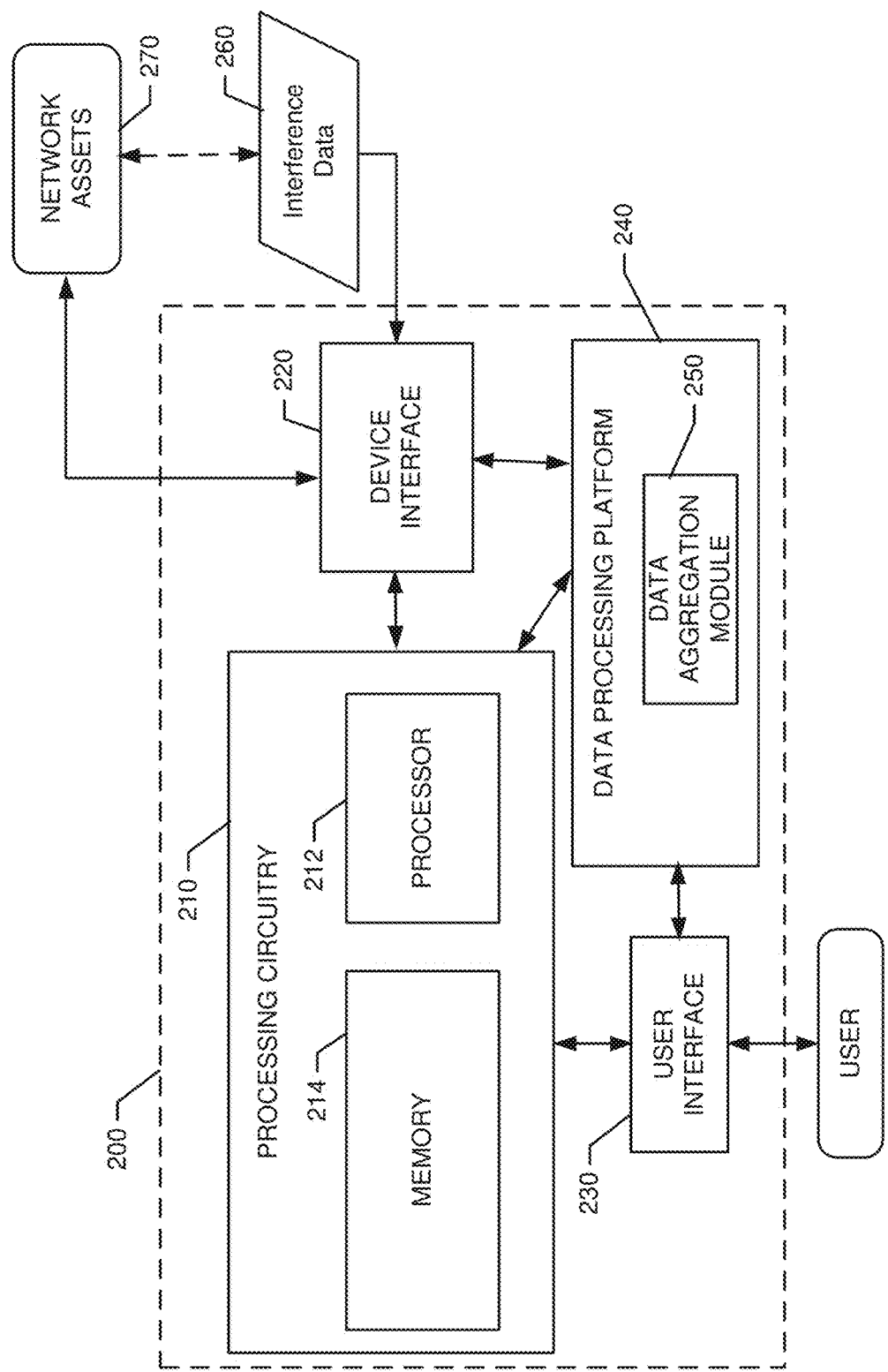
FIG. 2 illustrates a block diagram of an apparatus for determining aggregate radio interference in accordance with an example embodiment.

FIG. 2 illustrates a block diagram of an apparatus 200 for determining aggregate radio interference in accordance with an example embodiment. In this regard, for example, the apparatus 200 may include processing circuitry 210 that may be configurable to perform data processing functions in accordance with example embodiments. The processing circuitry 210 may be configured to receive various inputs, reference stored data and/or external data sources, and perform computations to provide outputs that can be generated much faster than is conventionally possible with typical packages generated with compiled languages. The processing circuitry 210 may therefore be configured to perform data processing, control function execution and/or other processing and management services according to an example embodiment of the present invention.

In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display, keyboard, mouse, speakers, and/or other input/output mechanisms.

The device interface 220 may include one or more interface mechanisms for enabling communication with other devices or components (e.g., internal and/or external devices or network components). In some cases, the device interface 220 may be any means such as a device or circuitry embodied in either hardware, or a combination of hardware and software that is configured to receive and/or transmit data from/to components or devices in communication with the processing circuitry 210. Thus, for example, the device interface 220 may provide interfaces for communication via different communication links.

The processor 212 may be embodied in a number of different ways. For example, the processor 212 may be embodied as one or multiple instances of various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of an interference data processing platform 240 based on inputs received by the processing circuitry 210. As such, in some embodiments, the processor 212 (or the processing circuitry 210) may be said to cause each of the operations described in connection with the interference data processing platform 240 in relation to operation of the interference data processing platform 240 to undertake the corresponding functionalities responsive to execution of instructions or algorithms configuring the processor 212 (or processing circuitry 210) accordingly. The interference data processing platform 240 may, in some cases, be embodied as, include or otherwise control the operation of a interference simulation module 250 that is configured to aggregate data in the manner described herein. As such, in some example embodiments, the interference data processing platform 240 may be configured to perform a plurality of processing functions on interference data 260 that is received regarding or even from various network assets 270. Among the processing functions that the interference data processing platform 240 may be configured to perform, at least one such function may be the determination of aggregate interference data (e.g., by the interference simulation module 250) as described herein.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from the network assets 270. Among the contents of the memory 214, applications may be stored for execution by the processor 212 in order to carry out the functionality associated with each respective application. In some cases, the applications may include instructions for carrying out functions relative to a spreadsheet or other data provided in a tabular format. The applications may further include instructions for operational control of the interference data processing platform 240 to aggregate data (e.g., to generate aggregate interference data based on inputted interference data that has been received) and allow substantially real-time updating of aggregate interference data when changes to the interference data are made or proposed as described herein.

The interference data processing platform 240 may be defined via an interpretive language that does not use compiling. In this regard, an interpretive language may generally be considered as a programming language for which implementations execute instructions directly, and without prior compiling of the program into machine language instructions. In an example embodiment, the interference data processing platform 240 may be defined, at least in part, by a series of spreadsheets that are arranged and configured in accordance with an example embodiment. As such, for example, Excel or similar commercially available spreadsheet program or spreadsheet application software may be employed in some cases so that Visual Basic functions and macros, or macros written in other interpretive programming languages, may be utilized to compute or otherwise determine aggregated interference data from the interference data received in association with geographically diverse emitters that may interfere with one or more victim receivers.

In some cases, the interference simulation module 250 may be configured to aggregate data using a number of different techniques. In this regard, for example, the interference simulation module 250 may be configured to aggregate data by taking into account the ability of tracking antennas to point in any and/or all azimuth directions and/or at different elevation angles. The aggregate interference data may be generated to include directional information in both azimuth and elevation with respect to either or both of the emitters and victim receivers. In an example embodiment, the aggregate interference data may further be displayed via operation of the interference data processing platform 240 in a tabular format (e.g., via the spreadsheets). By using an interpretive language (e.g., in the spreadsheet format), the instructions can be directly executed without loops and corner turns and actually end up being faster relative to processing (and real-time updating) of changes to the interference data.

The interference simulation module 250 may be configured to process the interference data by, for example, grouping interference sources into angle of arrival bins to enable computation of the aggregate interference data for a tracking (e.g., rotating) antenna for each particular direction for which tracking can be provided. In some cases, the interference simulation module 250 may also be configured to use a Fast Fourier Transform (FFT) to perform a spatial convolution integral on the interference data received for a rotating antenna with a fixed ensemble of interferers. In some cases, the convolution may include convolution of rotating antenna interference data with all of the interferers as a function of antenna pointing angles and angles of arrival using the FFT techniques for computation of the aggregate interference data. This convolution process may reduce the number of cells drastically. For example, in a spreadsheet context, one million cells may be reduced to approximately five thousand cells, which may reduce the file size from, for example, 15 MB to 1 MB and may also increase computational speed by a corresponding amount. This is similar to a spread sheet containing, for example, 50 rows and fifty columns, being enlarged into a spreadsheet containing 5000 rows and 5000 columns using, for example, the fill-right, fill-left, fill-up, and/or fill-down graphical user interface (GUI) features that characterize any modern spreadsheet program. The interference simulation module 250 may thus be configured to provide convenient and rapid modification of the designed antenna pointing angles of any of thousands of antennas (e.g., cellular sector antennas) in order to reduce interference to the tracking antennas prior to or after network deployment. In an example embodiment, the interference simulation module 250 may be configured to provide a unique way of encoding spreadsheet functions (e.g., in Visual Basic) to circumvent prohibited use of certain functions (e.g., Excel library functions in Visual Basic for Applications (VBA) functions). For example, functions that are defined for use in the Excel program cannot be independently used in the code used to write VBA macro programs. Thus, if one wishes to compute the sine of an angle-value xx in a VBA function, one can code a Taylor series approximation to the Excel sine function (written as sin(xx), thus eliminating the need to use the Excel "sin" function explicitly in the macro.

In some example embodiments, the interference data processing platform 240 may be further configured to allow importation of the interference data 260 from the network assets 270 themselves, from external databases, or from other applications or storage devices. The imported interference data 260 may, for example, include propagation path loss values. As such, the interference data processing platform 240 may be configured to enable point to point link budgets to be determined from each potential interferer to each potential victim receiver in a given area (or across a number of different areas) by using indirect addressing features from VBA or other macros to access data from external data sources. The external data sources may include vendor-provided data files that may include link budgets or other information including data provided as a function of antenna model, down-tilt angle, etc. The interference data processing platform 240 may also be configured to enable interference to be plotted as a function of tracking antenna pointing angle for each victim receiver in a given system so that tables can be generated to show a matrix of interference by sector antenna to each victim receiver. For example, suppose an aircraft telemetry tracking antenna points at several cell towers 10 or more kilometers away in the bearing "bin" corresponding to angles between 20.00 and 20.50 degrees from north. If the aggregate interference to the victim tracking antenna exceeds what is known as the "protection criteria" for interference at this pointing angle, it is straightforward to use the graphics features of a spreadsheet to plot the interference received in this bearing bin as a function of distance from the victim receiver. This will immediately identify the emitters (e.g., cell towers) that are producing interference, and permit the user of the invention to choose which (e.g., one or more) cell towers to "mitigate" by the use of cell-tower antenna gain adjustments, transmit power reduction, change in cell tower antenna pointing angle, etc.

Figure 3:
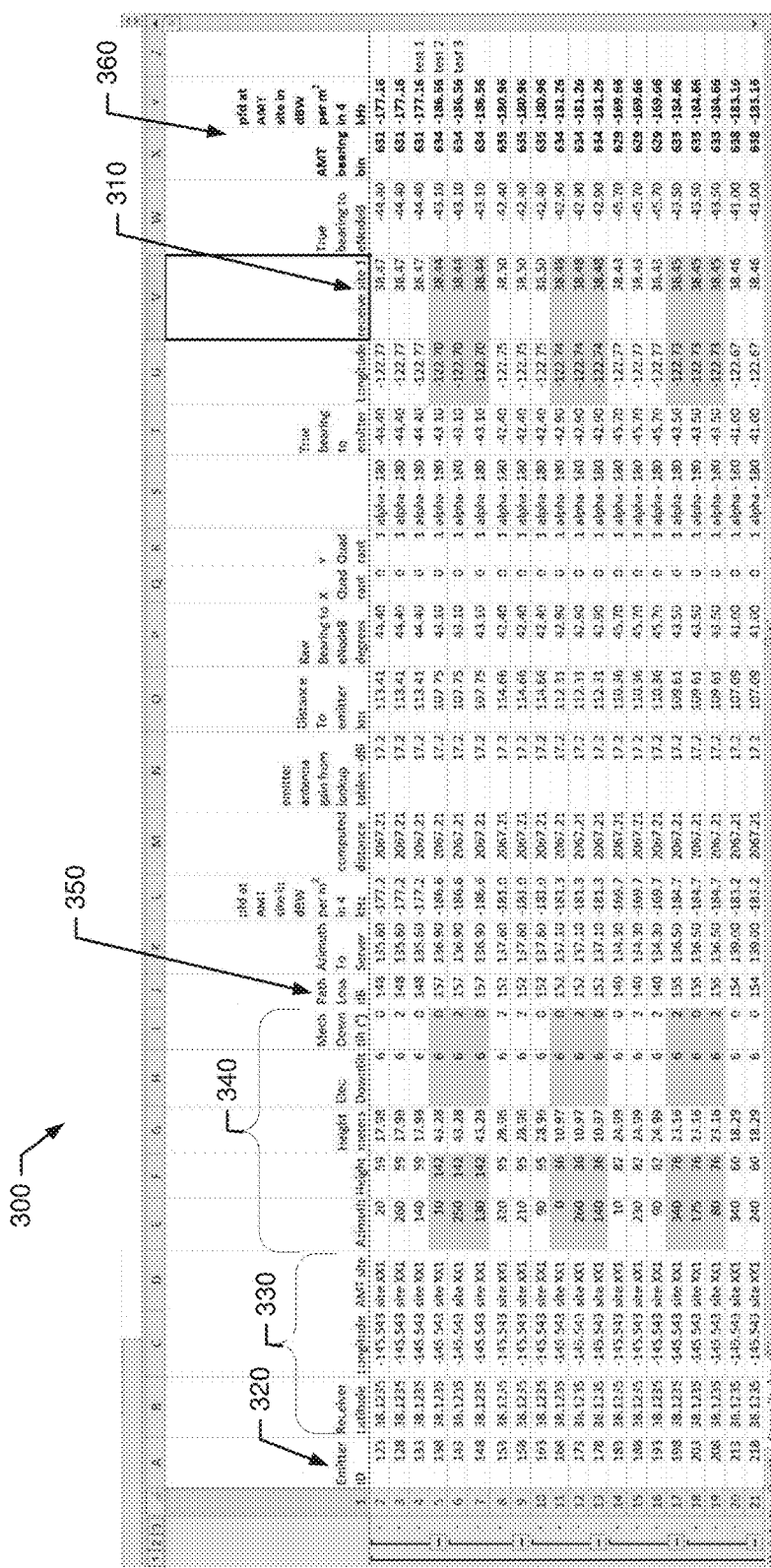
FIG. 3 illustrates a table for showing aggregate interference by emitter for a particular victim receiver in accordance with an example embodiment.

FIGS. 3-8 illustrate various examples of interference simulations using received transmitter calculations via spreadsheet tables that may be employed in accordance with an example embodiment. In this regard, FIG. 3 illustrates a table 300 (e.g., a spreadsheet page) for showing the aggregate interference by emitter for a particular victim receiver 310 (e.g., receive site 1) in accordance with an example embodiment. As shown in FIG. 3, the spreadsheet may include a column in which emitter identifiers 320 are provided for every emitter that may provide interference to the particular victim receiver 310. Geographic information 330 may be provided in one or more columns to identify the location of the particular victim receiver 310, along with orientation information 340. The orientation information 340 may define the azimuth, height, tilt angle and/or the like for the emitters relative to the particular victim receiver 310. Path loss information 350 may be provided in one column of the table 300, and various other parameters associated with the interference data (e.g., emitter antenna gain, power density, relative position, range (distance), electrical and/or mechanical antenna downtilt, filter attenuation, feeder loss etc.) may also be provided in respective columns. Other interference data may include, for example, aeronautical mobile telemetry (AMT) bin interference and power density information as shown in columns 360.

Figure 4:
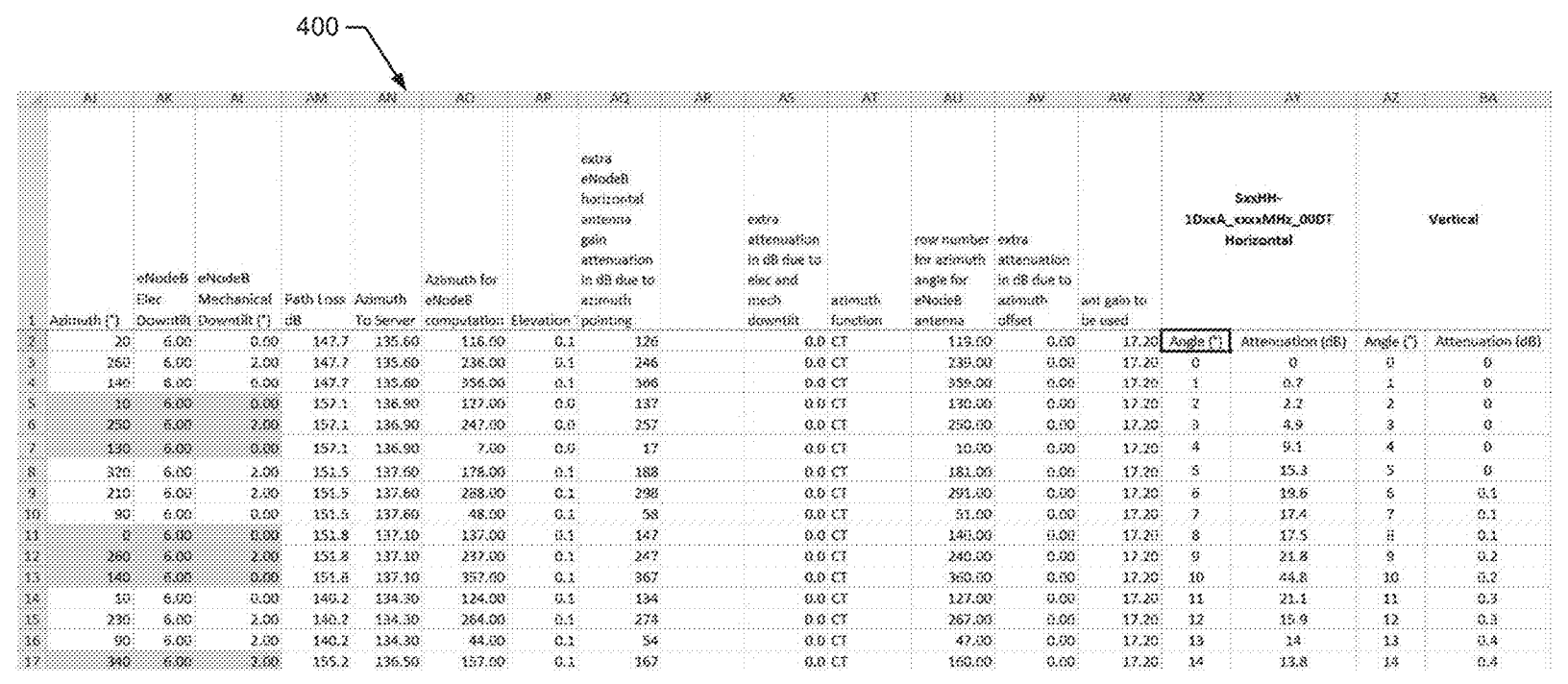

FIG. 4 illustrates an example of table look-up by indirect addressing in accordance with an example embodiment. For example, suppose an antenna on a particular sector of a specified cell tower is specified by the string variable "CellAnt23". Using indirect addressing, an embodiment of the invention may be configured/programmed to retrieve data associated with CellAnt23 from, for example, column XXX. However, as a design change, the cellular network designer might change the antenna to a model CellAnt24. The indirect addressing feature of an embodiment of the invention may then retrieve the numerical data associated with this antenna from, for example, column XXY. The data in columns XXX and XXY may be downloaded, in many cases, from the antenna manufacturer's web site, for example. In this regard, the table 400 of FIG. 4 includes data that may be provided by an external data source. Thus, as mentioned above, FIG. 4 and the table 400 therein may be examples of the type of vendor-provided data file that may include information on link budgets or other information that depends upon antenna model or the specific tilt angles or other characteristics of the antenna.

Figure 5:
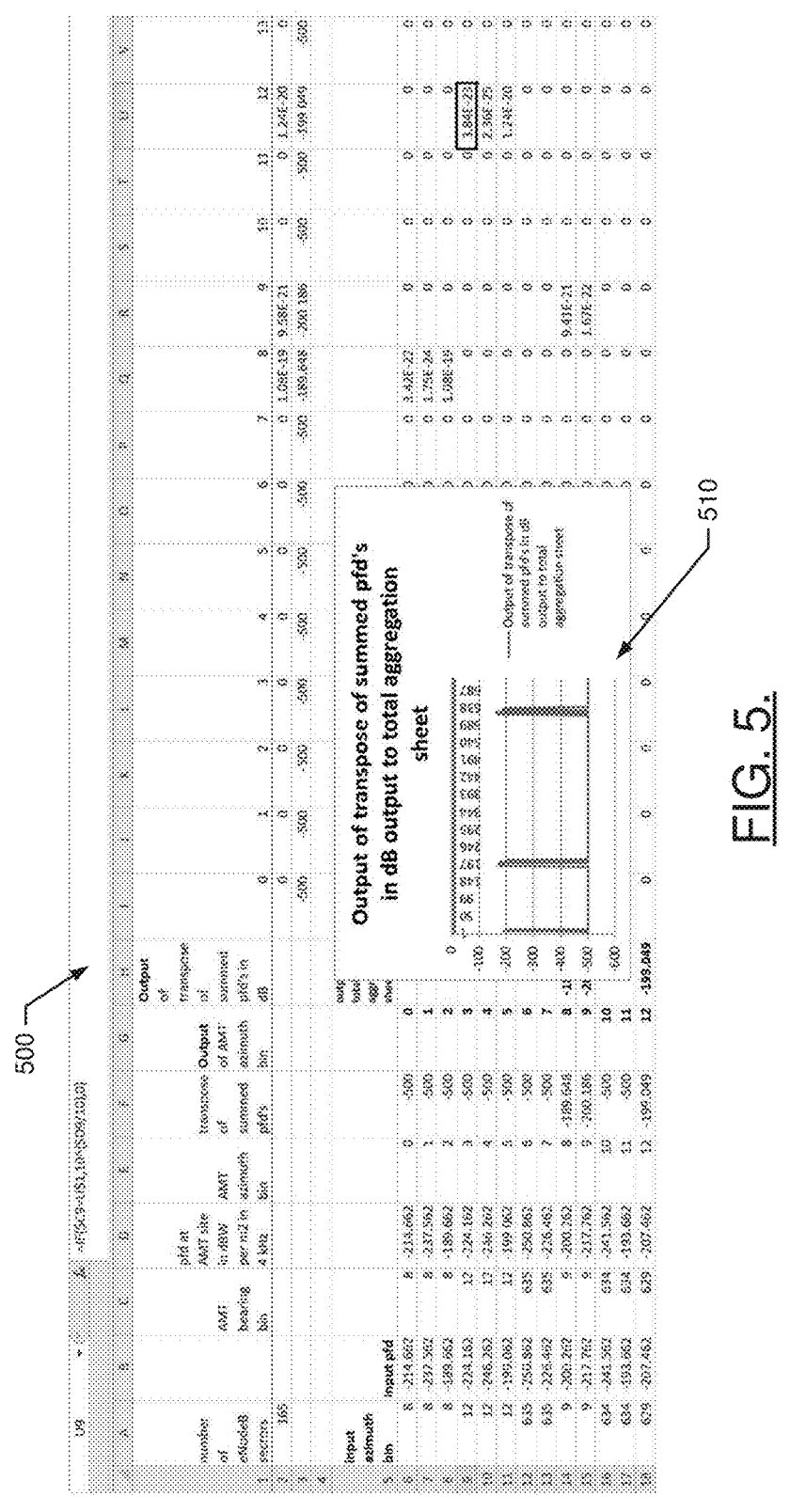

FIG. 5 illustrates an example output that may be generated in accordance with an example embodiment to show an aggregate of data received by bearing bin. In this regard, table 500 of FIG. 5 includes a graph 510 that is supplied as an output in some cases. The graph 510 may be provided in the form of an overlay that includes summed power densities that account for the rotation of an antenna by aggregation in accordance with example embodiments rather than requiring a plurality of loops to be conducted to repeat processing that would otherwise be performed with typical applications that use compiled code. Specifically, each individual loop for a traditional convolution "integral" may be replaced by its own column in the spread sheet, for example.

Figure 6:
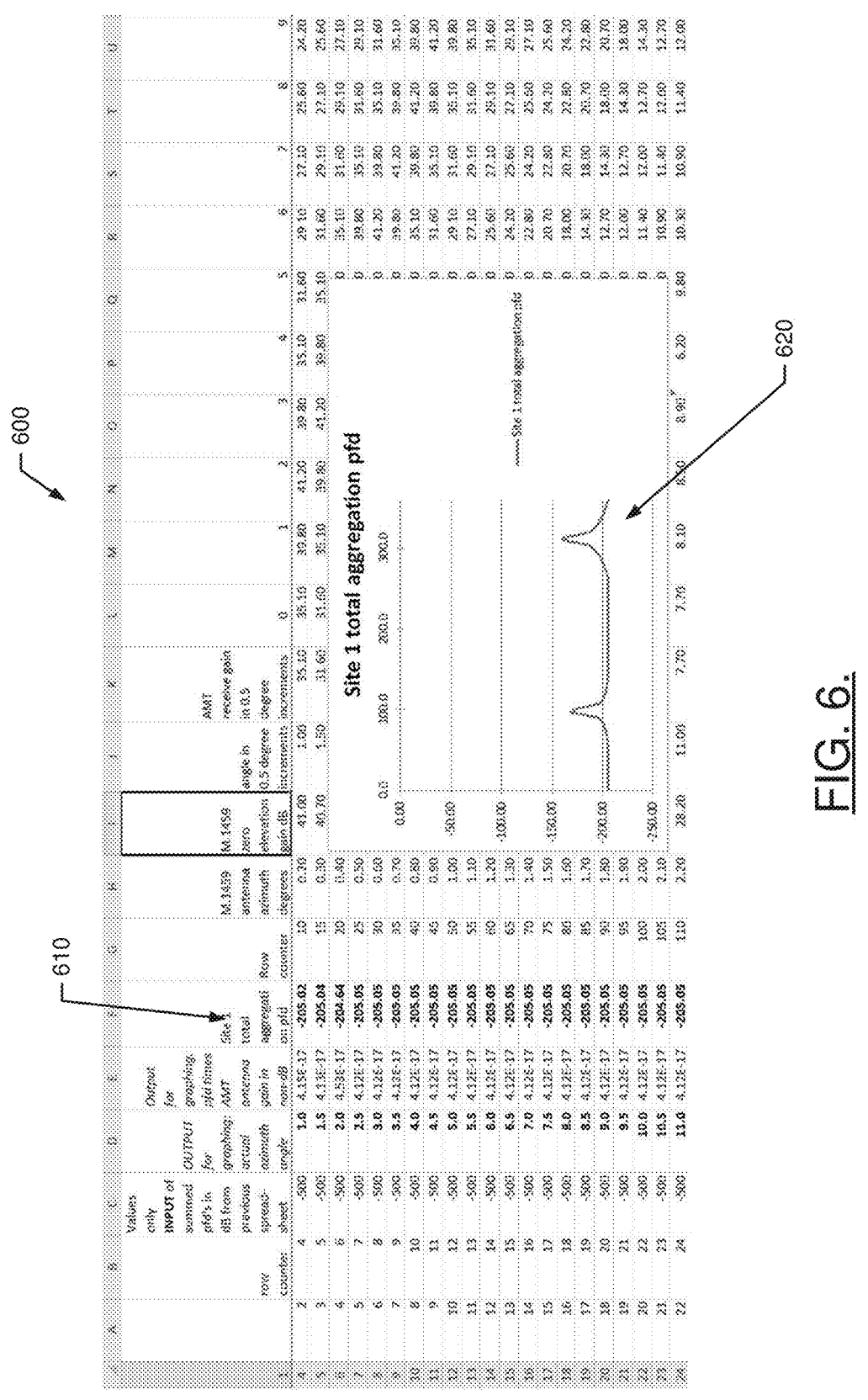
Figure 7:
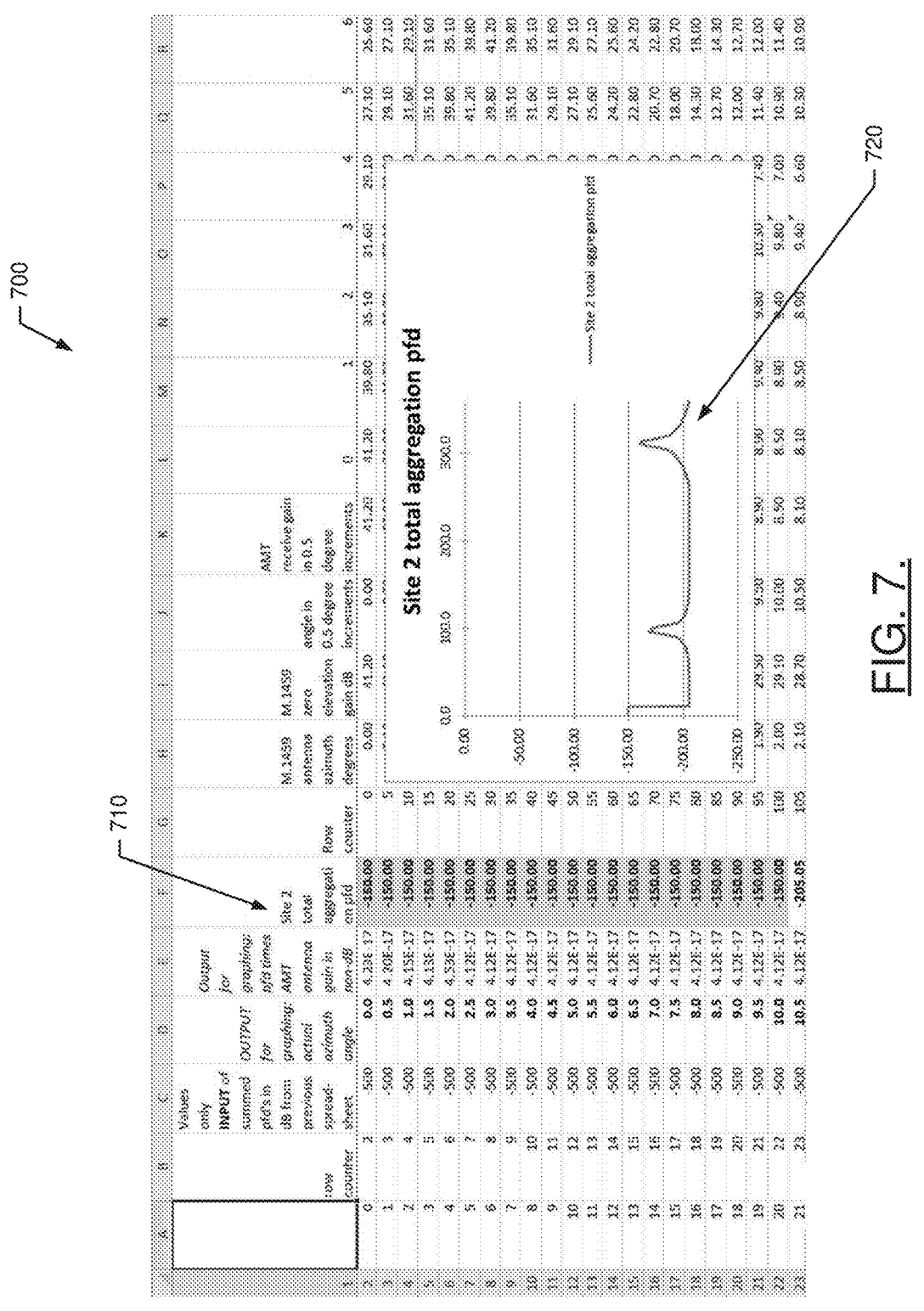
Figure 8:
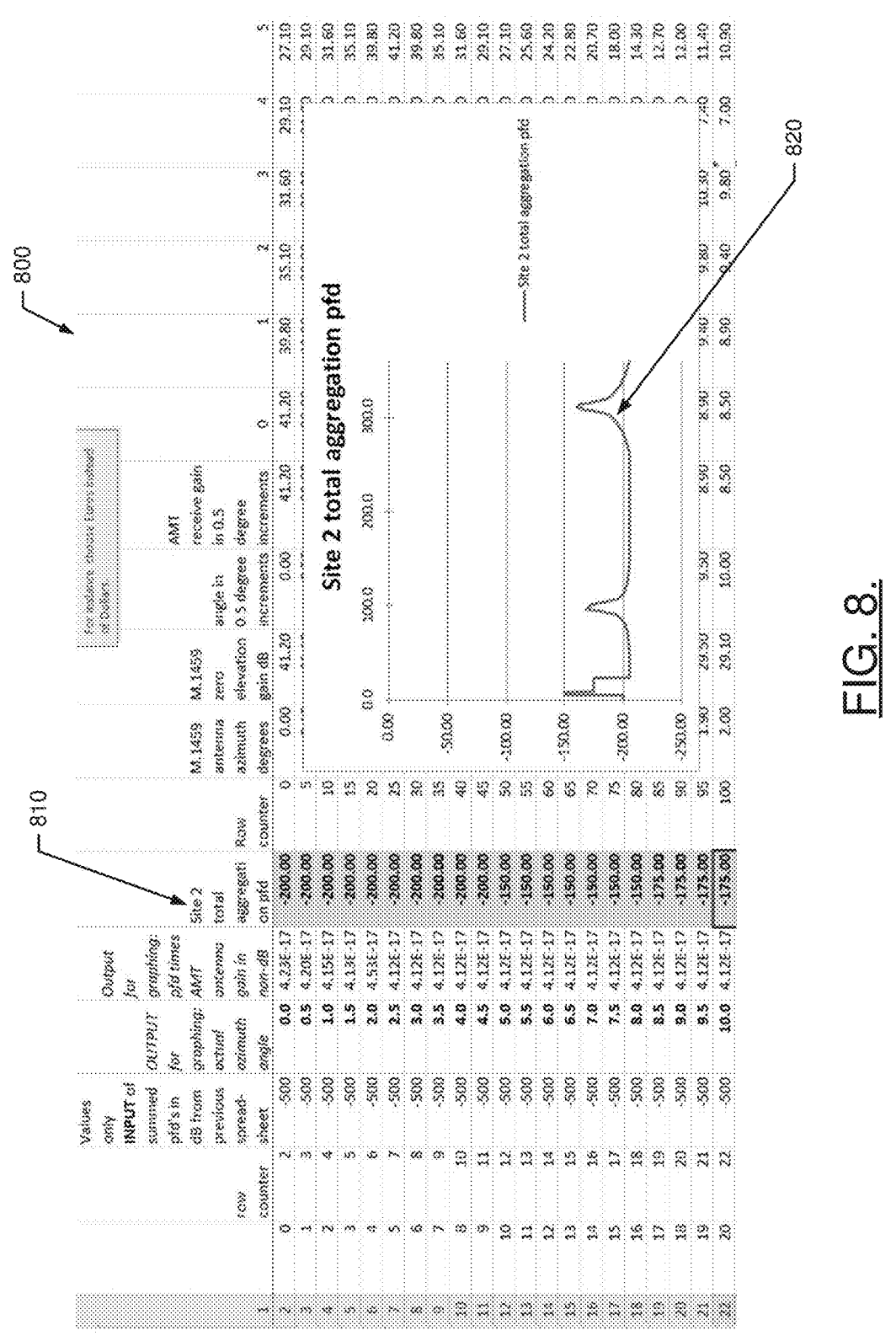

FIG. 6 illustrates results of a convolution operation (described below) performed in accordance with an example embodiment. In this regard, the table 600 of FIG. 6 includes a column that shows total aggregation of power density 610 for receiver site 1. It is also possible to generate a graph 620 illustrating the same. FIG. 7 illustrates a similar result for a different site (i.e., site 2) prior to modification of the data. Table 700 is therefore illustrative of total aggregation of power density 710 for receiver site 2 and the corresponding graph 720 illustrating the same. Meanwhile, responsive to an alteration being made to the data, the table 800 may be updated in real time as shown in FIG. 8. The power density 810 is updated in FIG. 8, and the graph 820 is also an updated version relative to the graph 720 of FIG. 7.

As discussed above, and demonstrated by FIGS. 3-8, example embodiments may (among other things) parallelize the computation associated with accounting for antennas that rotate or otherwise cover large areas by using bins to account for different ranges and angles. Combining radio and data processing elements in one solution can significantly reduce the processing cost and time. Radio signal path loss, which is normally computed inside a larger software package (and not stand-alone), can therefore be imported from a separate stand-alone application to reduce reliance on expensive software. Interference analysis can also be performed without massive amounts of for/next instructions and do-loops, which can be avoided. This greatly simplifies the process of reviewing results of interference analysis to large numbers of ground stations from a large number of interfering emitters. Example embodiments also allow look-ups based on indirect addressing of data entries to allow manufacturer-provided antenna pattern data files (or other such data—in any format) to yield numerical values for antenna patterns at specific pointing angles from interfering sources so that introduction of trigonometric corrections for a spherical earth geometry into computations that are normally conducted with less accurate flat-earth approximations can be accomplished. Example embodiments also enable relatively easy expansion and contraction of the table sizes. Thus, for example, a click and drag operation may be used to expand the spreadsheet column and row numbers. Fill-left/right up/down and other operations that are easy to accomplish in a spreadsheet context may also be performed. This feature also allows large files (e.g., 20 MB) to be shrunk for purposes of transferring (e.g., as email attachments) and then the files may be re-expanded upon receipt. This form of "zipping" a file for purposes of compression actually accomplishes the compression without being based on elimination of error-correction features. Accordingly data compression of the data file will not reduce or compromise error-correction features that are otherwise relied upon heavily in modern electronic communications. It is important to understand that in some embodiments, the size of the spreadsheet is related not to the amount of source data, but to the requirements of storing unrolled loops, embodied as unrolled columns and/or unrolled rows. Note that the data regarding the individual emitters and receivers is linear in the number of each category of information. It is the intermediate computation of what amounts to all possible permutations of emitters and receivers and all of the possible pointing angles of each that creates the large number of cells, and consequently the large file size associated with a spreadsheet. Put differently, the size, in data storage, of a spreadsheet grows super-linearly with the number of transmitters and receivers being modeled/simulated.

Additionally, as noted above, to account for rotation of victim antennas (e.g., receiver sites), example embodiments may perform convolution integrals using open loop processes. In this regard, for example, linear integration may be performed one column at a time, but with each new column retaining, in a manner similar to recursion, the computation performed on the previous column. This form of convolution is similar to the manner in which a Fourier transform changes N-squared computational complexity to N times log N computational complexity (which yields the FFT). For a particular application, example embodiments may reduce the time it takes for a spreadsheet to compute (which is a critical factor for batch processing of interference calculations). As such, real time calculation of the interference associated with any of a plurality of receive antennas (which may each point in hundreds to thousands of specific value combinations of antenna elevation and azimuth pointing angles) relative to potentially thousands of interfering emitter antennas may be possible.

Figure 9:
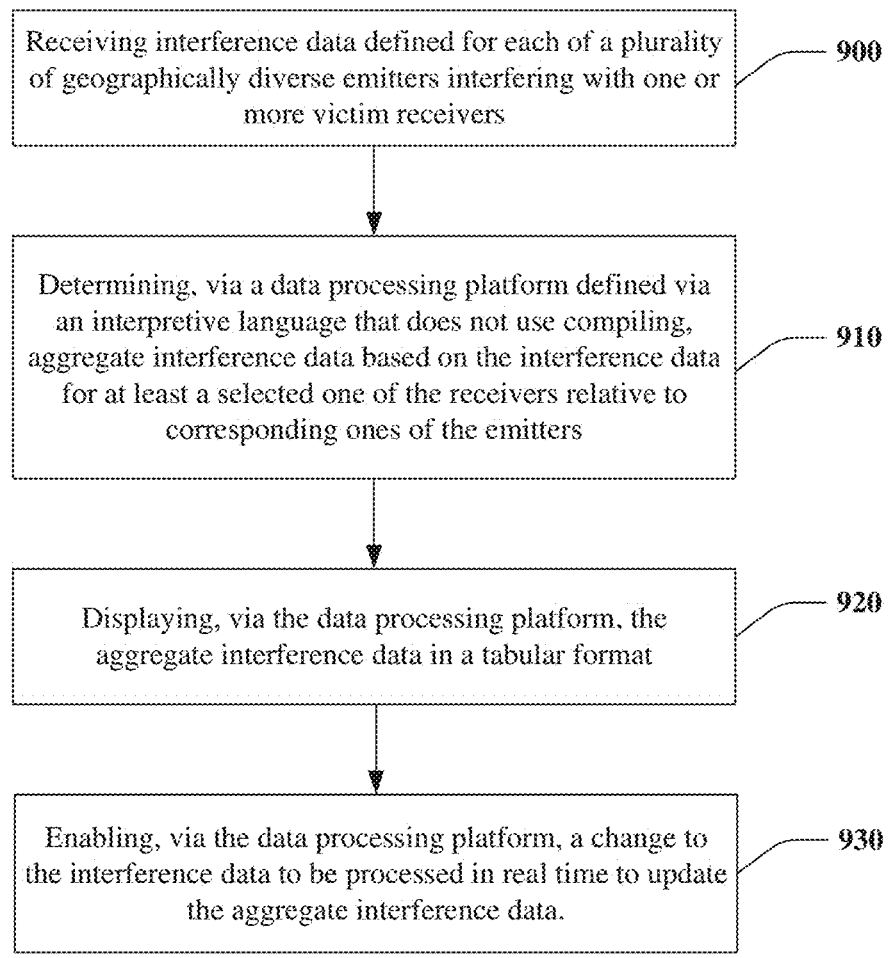
FIG. 9 illustrates a block diagram of a method in accordance with an example embodiment.

As such, the apparatus 200 of FIG. 2 may provide an environment in which the interference data processing platform 240 may provide a mechanism via which a number of useful methods may be practiced. FIG. 9 illustrates a block diagram of one method that may be associated with the apparatus 200 of FIG. 2. From a technical perspective, the apparatus 200 and/or the interference data processing platform 240 described above may be used to support some or all of the operations described in FIG. 9. As such, the platform described in FIG. 2 may be used to facilitate the implementation of several computer program and/or network communication based interactions. As an example, FIG. 9 is a flowchart of a method and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., of the apparatus 200) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for simulating interference according to one example embodiment is shown in FIG. 9. The method may include receiving interference data defined for each of a plurality of geographically diverse emitters interfering with one or more victim receivers at operation 900. The interference data is received at a data processing platform defined via an interpretive language that does not use compiling. The method may further include determining, via the data processing platform, aggregate interference data based on the interference data for at least a selected one of the receivers relative to corresponding ones of the emitters at operation 910. The aggregate interference data may include directional information in both azimuth and elevation (and sometimes also in distance) with respect to both the emitters and the receivers (and sometimes also taking into account the almost-spherical shape of the earth). The method may further include displaying, via the data processing platform, the aggregate interference data in a tabular format at operation 920, and enabling, via the data processing platform, a change to the interference data to be processed in real time to update the aggregate interference data at operation 930.

In some embodiments, the method (and a corresponding apparatus configured to perform the method) may include (or be configured to perform) additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the directional information may include angle of arrival bins defining data associated with different relative pointing directions of the selected one of the receivers to respective ones of the emitters. Additionally or alternatively, the directional information may include information associated with a particular pointing angle of a receive antenna at a corresponding one of the emitters. Additionally or alternatively, the directional information may include information associated with a particular pointing angle of an emitter antenna at a corresponding one of the receivers. Additionally or alternatively, the directional information may include a convolution of data associated with different pointing angles of a rotating or elevating antenna. In such an example, the convolution of data may include a convolution integral defined by an open-loop process for performing linear integration on sequential rows or columns of data with each new row or column recursively retaining computation data associated with a prior row or column. In some example embodiments, the interference data is further supplemented with radio signal path loss data from a separate application. In an example embodiment, the method may further include calculating and incorporating adjustments to path loss in real time for a change in the interference data, or for a change to emitter or receiver antenna patterns in real time. In some examples, cells in the tabular format may be linked via indirect addressing of data entries to antenna pattern data files including azimuth and elevation information. In an example embodiment, additional cells in the tabular format may be creatable and deletable by click and drag operations. In an example embodiment, the data processing platform may employ open-loop computations to avoid loops and circular references. In an example embodiment, the data processing platform may employ text editing functions to perform data compression without reduction in error correction features.

Accordingly, an example embodiment may provide scalability of the processes described herein to permit arbitrarily larger amounts of data to be processed in a manner that scales linearly, rather than as the square, cube, or exponent of the data size, in both processing time and memory requirements. Example embodiments may also provide for parallizability of the processes so that multiple versions of the processing circuitry described above can be used with different subsets of the tabular data in order to permit unlimited parallel processing with linear speed improvement proportional to the number of independent processors. Example embodiments may also enable the use of untrained personnel to perform the text editing functions and other calculations described herein. Example embodiments may also provide the capability to implement compression, via the processing circuitry, so that data in the tabular format can be replicated, and reduced to file sizes for which email systems readily function.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus comprising processing circuitry, the processing circuitry being configured to execute an interference simulation using a plurality of processing functions on interference data defined for each of a plurality of geographically diverse emitters interfering with one or more victim receivers via a data processing platform, the data processing platform being defined via an interpretive language that does not use compiling,
wherein the processing functions include:
determining aggregate interference data, based on the interference data, for at least a selected one of the receivers relative to corresponding ones of the emitters, the aggregate interference data including directional information in both azimuth and elevation with respect to both the emitters and the receivers;
displaying the aggregate interference data in a tabular format; and
enabling a change to the interference data to be processed in real time to update the aggregate interference data.

2. The apparatus of claim 1, wherein the directional information comprises angle of arrival bins defining data associated with different relative pointing directions of the selected one of the receivers to respective ones of the emitters.

3. The apparatus of claim 1, wherein the directional information comprises information associated with a particular pointing angle of a receive antenna at a corresponding one of the emitters.

4. The apparatus of claim 1, wherein the directional information comprises information associated with a particular pointing angle of an emitter antenna at a corresponding one of the receivers.

5. The apparatus of claim 1, wherein the directional information comprises a convolution of data associated with different pointing angles of a rotating or elevating antenna.

6. The apparatus of claim 5, wherein the convolution of data comprises a convolution integral defined by an open-loop process for performing linear integration on sequential rows or columns of data with each new row or column recursively retaining computation data associated with a prior row or column.

7. The apparatus of claim 1, wherein the interference data is further supplemented with radio signal path loss data from a separate application.

8. The apparatus of claim 7, wherein the processing functions further include calculating and incorporating adjustments to path loss in real time for a change in the interference data, or for a change to emitter or receiver antenna patterns in real time.

9. The apparatus of claim 1, wherein cells in the tabular format are linked via indirect addressing of data entries to antenna pattern data files including azimuth and elevation information.

10. The apparatus of claim 1, wherein additional cells in the tabular format are creatable and deletable by click and drag operations.

11. The apparatus of claim 1, wherein the data processing platform employs open-loop computations to avoid loops and circular references.

12. The apparatus of claim 1, wherein the data processing platform employs text editing functions to perform data compression without reduction in error correction features.

13. A method for simulating interference comprising:
receiving interference data defined for each of a plurality of geographically diverse emitters interfering with one or more victim receivers, the interference data being received at a data processing platform defined via an interpretive language that does not use compiling;
determining, via the data processing platform, aggregate interference data based on the interference data for at least a selected one of the receivers relative to corresponding ones of the emitters, the aggregate interference data including directional information in both azimuth and elevation with respect to both the emitters and the receivers;
displaying, via the data processing platform, the aggregate interference data in a tabular format; and
enabling, via the data processing platform, a change to the interference data to be processed in real time to update the aggregate interference data.

14. The method of claim 13, wherein determining the aggregate interference data comprises determining the aggregate interference data to include the directional information comprising angle of arrival bins defining data associated with different relative pointing directions of the selected one of the receivers to respective ones of the emitters.

15. The method of claim 13, wherein determining the aggregate interference data comprises determining the aggregate interference data to include the directional information comprising a convolution of data associated with different pointing angles of a rotating or elevating antenna.

16. The apparatus of claim 15, wherein determining the aggregate interference data to include the directional information comprising a convolution of data comprises determining the aggregate interference data to include the directional information based on a convolution integral defined by an open-loop process for performing linear integration on sequential rows or columns of data with each new row or column recursively retaining computation data associated with a prior row or column.

17. The method of claim 13, further comprising calculating and incorporating adjustments to path loss in real time for a change in the interference data, or for a change to emitter or receiver antenna patterns in real time.

18. The method of claim 13, further comprising linking cells in the tabular format via indirect addressing of data entries to antenna pattern data files including azimuth and elevation information.

19. The method of claim 13, further comprising creating additional cells or deleting cells in the tabular format by click and drag operations.

20. A system for simulating interference comprising:
a plurality of geographically diverse emitters;
one or more victim receivers with which the emitters interfere; and
a data processing platform defined via an interpretive language that does not use compiling, the data processing platform being configured to receive interference data associated with the receivers and emitters,
wherein the data processing platform is configured to:
determine aggregate interference data based on the interference data for at least a selected one of the receivers relative to corresponding ones of the emitters, the aggregate interference data including directional information in both azimuth and elevation with respect to both the emitters and the receivers;
display the aggregate interference data in a tabular format; and
enable a change to the interference data to be processed in real time to update the aggregate interference data.

* * * * *